(12) United States Patent
Robins et al.

(10) Patent No.: US 6,636,357 B2
(45) Date of Patent: Oct. 21, 2003

(54) ELECTRICALLY VARIABLE OPTICAL FILTER

(75) Inventors: Mark N. Robins, Greeley, CO (US); Heather N. Bean, Fort Collins, CO (US); Matthew Flach, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 51 days.

(21) Appl. No.: 10/060,128

(22) Filed: Jan. 30, 2002

(65) Prior Publication Data

US 2003/0142406 A1 Jul. 31, 2003

(51) Int. Cl.[7] .............................................. G02B 27/00
(52) U.S. Cl. ...................... 359/579; 359/498; 359/578; 385/16; 385/24; 372/98; 356/519
(58) Field of Search ................................. 359/498, 578, 359/579; 356/519; 372/14, 98, 108; 385/16, 24

(56) References Cited

U.S. PATENT DOCUMENTS

| | | | |
|---|---|---|---|
| 4,324,475 A | * | 4/1982 | Purdie .......................... 356/519 |
| 5,481,402 A | | 1/1996 | Cheng et al. |
| 5,606,439 A | | 2/1997 | Wu |
| 6,035,089 A | | 3/2000 | Grann et al. |
| RE37,044 E | | 2/2001 | Wu |
| 6,246,818 B1 | | 6/2001 | Fukushima |
| 6,256,428 B1 | | 7/2001 | Norwood et al. |
| 6,270,223 B1 | | 8/2001 | Bon et al. |

* cited by examiner

Primary Examiner—John Juba
Assistant Examiner—Fayez Assaf (57) ABSTRACT

An electrically variable optical filter includes a first optical element including a first angled face and a second optical element including a second angled face. The second angled face is substantially parallel to and spaced apart from the first angled face. At least one separation actuator is affixed between the first optical element and the second optical element and is operable to change a separation distance D between the first angled face and the second angled face. Light waves transmitted through the first optical element are selectively transmitted through to or reflected away from the second optical element as a function of wavelength and the separation distance D.

24 Claims, 6 Drawing Sheets

ELECTRICALLY VARIABLE OPTICAL FILTER

FIELD OF THE INVENTION

The present invention relates generally to an optical filter, and more particularly to an electrically variable optical filter.

BACKGROUND OF THE INVENTION

Many types of modern electronic devices use light waves in operation. Examples are imaging devices, measurement equipment, optical communications, optical computing, etc. During operation, such a device may filter or block incident light. For example, an electronic device may need to filter out specific wavelengths or bands of light.

In the prior art, filtering out of specific wavelengths or bands of light has been performed in many ways. The most common approach has been using mechanical devices, including tints, gratings, polarizers, etc., to provide a filter having a fixed wavelength transmission property.

Although prior art filters of fixed wavelength transmission properties are generally accurate and transmit a reasonable percentage of desired light, they lack an ability to accommodate changes in desired optical wavelengths.

In a growing number of applications there is a need for a variable optical filter. Prior art variable optical filters exist. In order to vary the filtered output wavelengths, the prior art approaches typically rely on multiple filters, mechanical filter selection, movable mirrors, etc. The prior art controllable filters therefore are mainly controllable in a mechanical fashion. However, such mechanical devices are vulnerable to dirt and wear, have a less than desired reliability, etc. Moreover, in prior art mechanically variable optical filter devices, the changing of the filter wavelength may suffer from an inadequate response time and may lack an adequate variable wavelength range. In addition, the prior art variable optical filters tend to be expensive and bulky.

Alternatively, prior art electrically variable optical filters exist. One example is an electrically controllable polarizer. Another prior art electrically variable optical filter uses a presence or absence of a fluid in a sealed channel to enable and disable filtering. Electrically controllable optical filters therefore generally comprise only an on/off control over the desired wavelength or band of light and cannot control the wavelength characteristics of the filter over a tunable band. For example, the wavelength in a sealed channel/fluid optical filter is not changeable due to the sealed nature of the channel.

Therefore, there remains a need in the art for improvements to optical filters.

SUMMARY OF THE INVENTION

An electrically variable optical filter comprises a first optical element including a first angled face and a second optical element including a second angled face. The second angled face is substantially parallel to and spaced apart from the first angled face. At least one separation actuator is affixed between the first optical element and the second optical element and is operable to change a separation distance D between the first angled face and the second angled face. Light waves transmitted through the first optical element are selectively transmitted through to or reflected away from the second optical element as a function of wavelength and the separation distance D.

DETAILED DESCRIPTION

Figure 1:
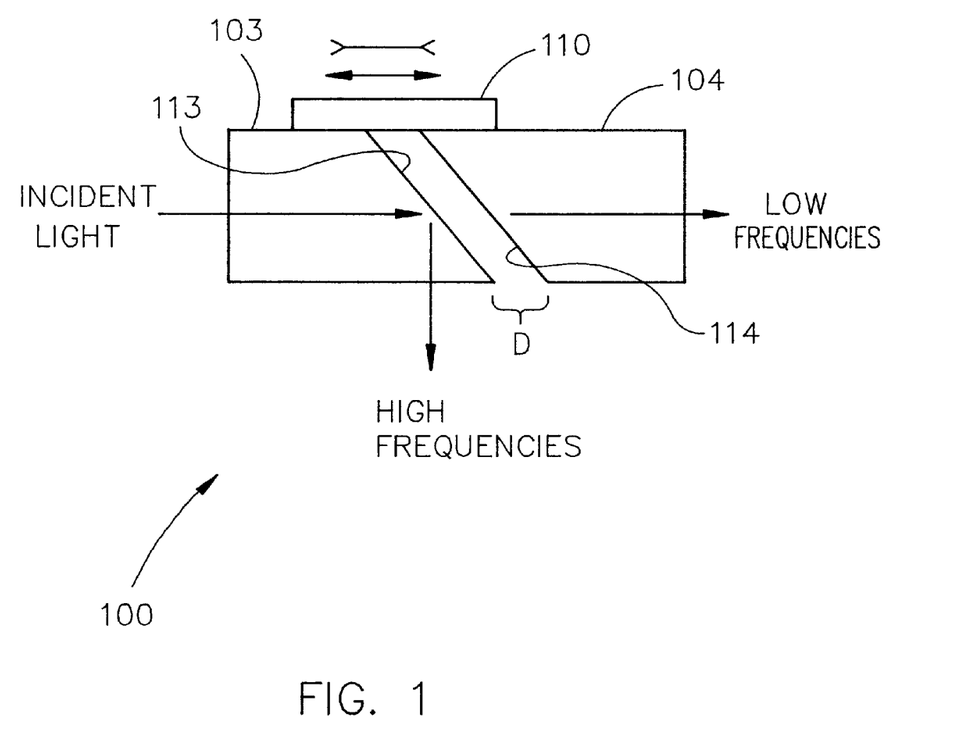
FIG. 1 is a schematic diagram of an electronically variable optical filter according to one embodiment of the invention.

FIG. 1 is a schematic diagram of an electronically variable optical filter 100 according to one embodiment of the invention. The electronically variable optical filter 100 includes a first optical element 103 including a first angled face 113, a second optical element 104 including a second angled face 114, and at least one separation actuator 110. The first optical element 103 is separated from the second optical element 104 by a separation distance D. Therefore, a gap exists between the first optical element 103 and the second optical element 104. The gap may be an air gap.

The separation distance D controls the transmission of light between the first optical element 103 and the second optical element 104. This is possible because the two optical elements transmit or reflect incident light as a strong function of the separation distance D relative to the wavelength λ of the incident light. Light of a wavelength approximately less than the separation distance D will be reflected at the first angled face 113. Conversely, if the wavelength of incident light exceeds the separation distance D, quantum tunneling of the light across the gap occurs, and the light is therefore transmitted through to the second angled face 114 and therefore into the second optical element 104.

Because of the quantum tunneling effect, the separation distance D provides a well defined wavelength cutoff point. This wavelength cutoff is a sharp negative exponential function of the separation distance D. Therefore, the separation distance D may be varied in order to control the wavelength cutoff point. As a result, the device may act as an optical filter, passing all light of frequencies less than the cutoff frequency corresponding to the given wavelength λ (i.e., the device passes all light of wavelength less than λ, where λ=c/f and c is the speed of light through the optical element). Therefore, the electronically variable optical filter 100 may be thought of as a low pass filter that passes all light frequencies below a cutoff frequency, with the cutoff frequency being electrically variable. Alternatively, it may be thought of as a frequency-based optical beam splitter that splits incident light at a cutoff frequency, with the cutoff frequency being electrically variable.

As a consequence of the quantum tunneling effect, the device may form an optical filter. More importantly, the device may form a variable optical filter, wherein the cutoff frequency is controlled by the separation distance D. The separation distance D may be accurately controlled by one or more separation actuators 110 positioned across the gap and attached to both the first optical element 103 and the second optical element 104. Alternatively, the electronically variable optical filter 100 may be an optical switch that may be used to selectively transmit or block incident light. Advantageously, the electronically variable optical filter 100 as an optical switch may be used with light of any frequency/wavelength, including incident light of specific frequencies or frequency bands. Furthermore, the electronically variable optical filter 100 as an optical switch may be used with light of varying frequencies. In yet another alternative, the electronically variable optical filter 100 may be used to form an electrically variable optical prism that outputs a plurality of optical frequency bands.

The first and second optical elements 103 and 104 may be prisms, and may be formed of any suitable light-transmissive material, such as glass, plastic, etc. The first and second angled faces 113 and 114 may be formed at an angle of about 45 degrees. It should be noted that the angle is not critical for the transmission or reflection of light, and controls only the angle of the "rejected" light. Other angle values may be employed. The angled faces are included so that if the incident light (or alternatively some frequencies thereof) is rejected at the first angled face 113, it will be reflected away to become a second beam. This second beam may be used for other purposes (see FIG. 2 below).

In operation, the separation actuator 110 may vary the separation distance D in order to control the transmission or reflectance of light entering the first optical element 103. Therefore, the separation actuator 110 may be any type of electrical actuator capable of controlling the separation distance D. In one embodiment, the separation actuator 110 is a piezoelectric separation actuator that shrinks and expands in response to an electrical current. However, other actuators may also be used, such as magnetic devices, solenoids, etc. The electrical drive current and the response time of the separation actuator 110 may be kept very small through micro-fabrication techniques.

The separation actuator 110 is affixed between the two optical elements. The separation actuator 110 may be positioned on an exterior surface of both optical elements and may be connected or affixed to both, such as by an adhesive or by optical element mounts. In one embodiment, a electrically variable optical filter 100 may be constructed on an optical array, i.e., may be grown on a chip. Alternatively, a separation actuator 110 may be positioned between the two optical elements and affixed to the angled faces (i.e., positioned in the gap). When actuated by an electrical current, the separation actuator 110 expands in a known manner, and therefore may be used to control the separation distance D. The separation actuator(s) therefore enables the device to act as an electrically variable optical filter. Furthermore, the wavelength cutoff of the electrically variable optical filter 100 may be varied over the entire optical light spectrum (i.e., the wavelength cutoff may vary from about 400 nanometers (nm) to about 700 nm). The electrically variable optical filter 100 may additionally be used for non-visible light.

Figure 2:
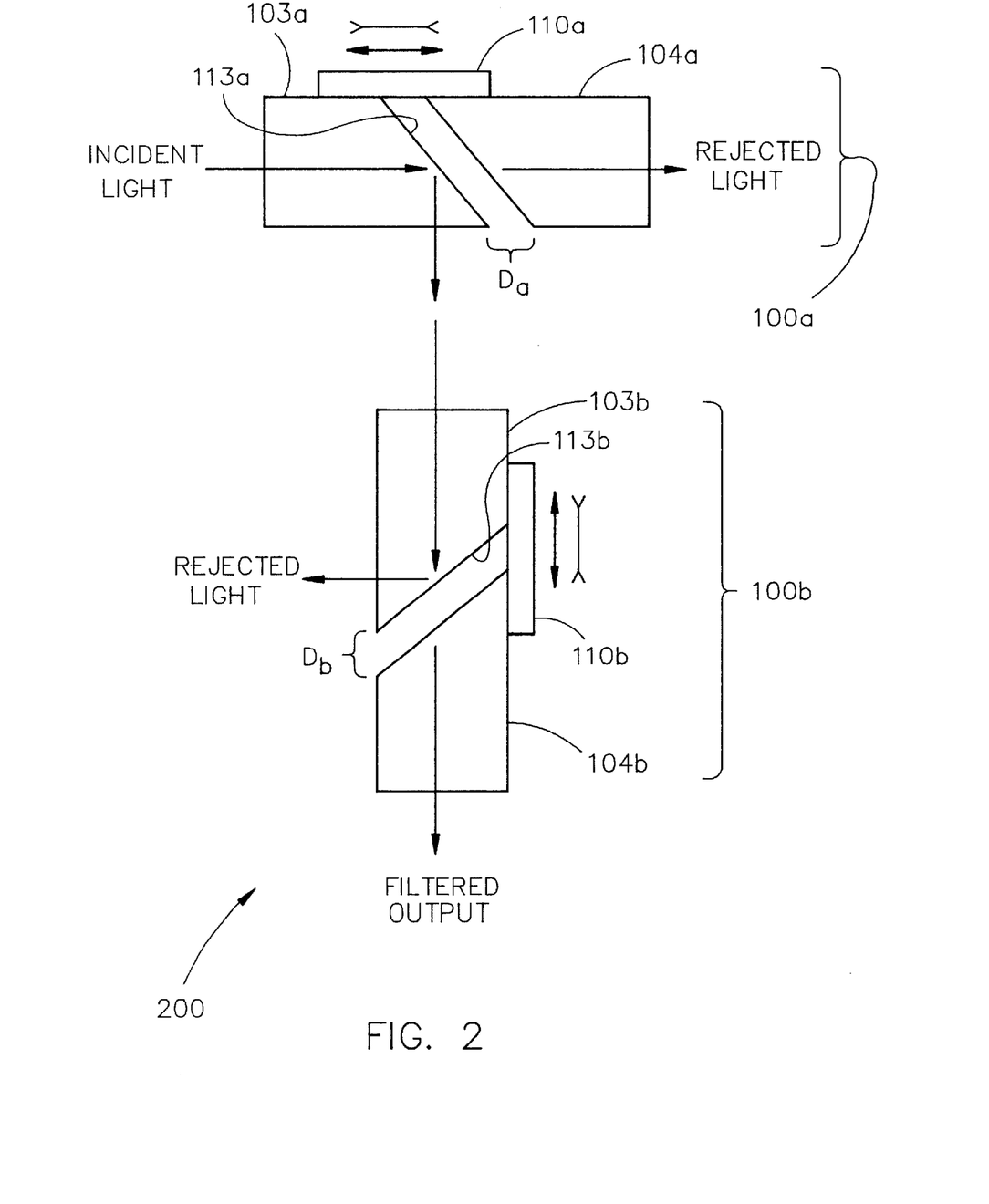
FIG. 2 is a schematic diagram of a band pass filter formed of two electrically variable optical filters.

FIG. 2 is a schematic diagram of a band pass filter 200 formed of two electrically variable optical filters 100a and 100b according to the invention. The first filter 100a has a first separation distance $D_a$ and therefore a first cutoff frequency $f_a$. The second filter 100b has a second separation distance $D_b$ and therefore a second cutoff frequency $f_b$. The first cutoff frequency $f_a$ is less than the second cutoff frequency $f_b$ in order to produce a band pass filter response (see FIG. 3 and the accompanying discussion below). Therefore, if the frequency of the incident light is above the first cutoff frequency $f_a$ and below the second cutoff frequency $f_b$, it will pass through the band pass filter 200. If the incident light is not within the desired band, then it will be rejected by one or the other of the two optical filters 100a and 100b.

Unlike a conventional radio frequency filter, however, the rejected optical frequencies are not attenuated, but are merely reflected away from the original incident light path. The first filter 100a therefore divides the incident light into a low frequency light beam (as in a low pass filter), and a high frequency light beam (as in a high pass filter). A filter arrangement therefore may use either (or both) emitted light beams in order to filter and manipulate the incident light. In the filter arrangement shown, the first filter 100a is employed as a high pass filter, with all incident optical frequencies above the first cutoff frequency $f_a$ being reflected at the second angled face 114a. The reflected high frequencies are received in the second filter 100b. The second filter 100b is employed as a low pass filter, with all incident optical frequencies below the second cutoff frequency $f_b$ being transmitted through the second angled face 114b to form the band pass filtered output.

As a result, combinations of such filters can allow for specific optical frequency bands to be transmitted or rejected. Optical flats (i.e., panel filter elements) can be prepared that vary within a small fraction of a wavelength of visible light, allowing such a panel filter element to be large enough to form a useful electrically variable optical filter for a wide variety of practical applications. In one embodiment, this may be done by forming a two-dimensional array of small, angled elements. One such application may be as a filter unit in an image capturing device, wherein a panel filter element may be formed of a size to cover an entire lens aperture (see FIG. 5 below).

Figure 3:
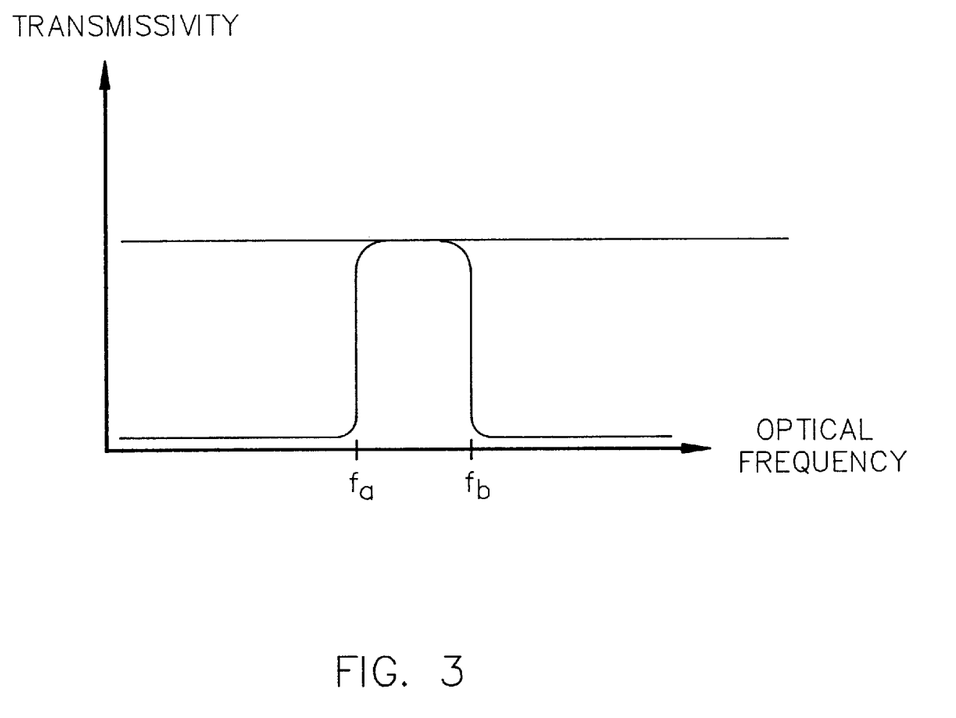
FIG. 3 is a graph of the frequency response of the band pass filter of FIG. 2.

FIG. 3 is a graph of the frequency response of the band pass filter 200 of FIG. 2. The graph shows the first and second cutoff frequencies $f_a$ and $f_b$, and the shape of the resultant band pass frequency response. By appropriate selection and combination of electrically variable optical filters, the band pass filter response may be varied as desired. For example, the band pass filter response may be narrowed or widened during actual operation (i.e., on-the-fly) by controlling one or both of the electrical separation actuators 110. Not only may the width of the frequency response band be controlled, but also the position of the pass band in the visible light spectrum (i.e., the band pass response may be shifted up or down in the spectrum).

Figure 4:
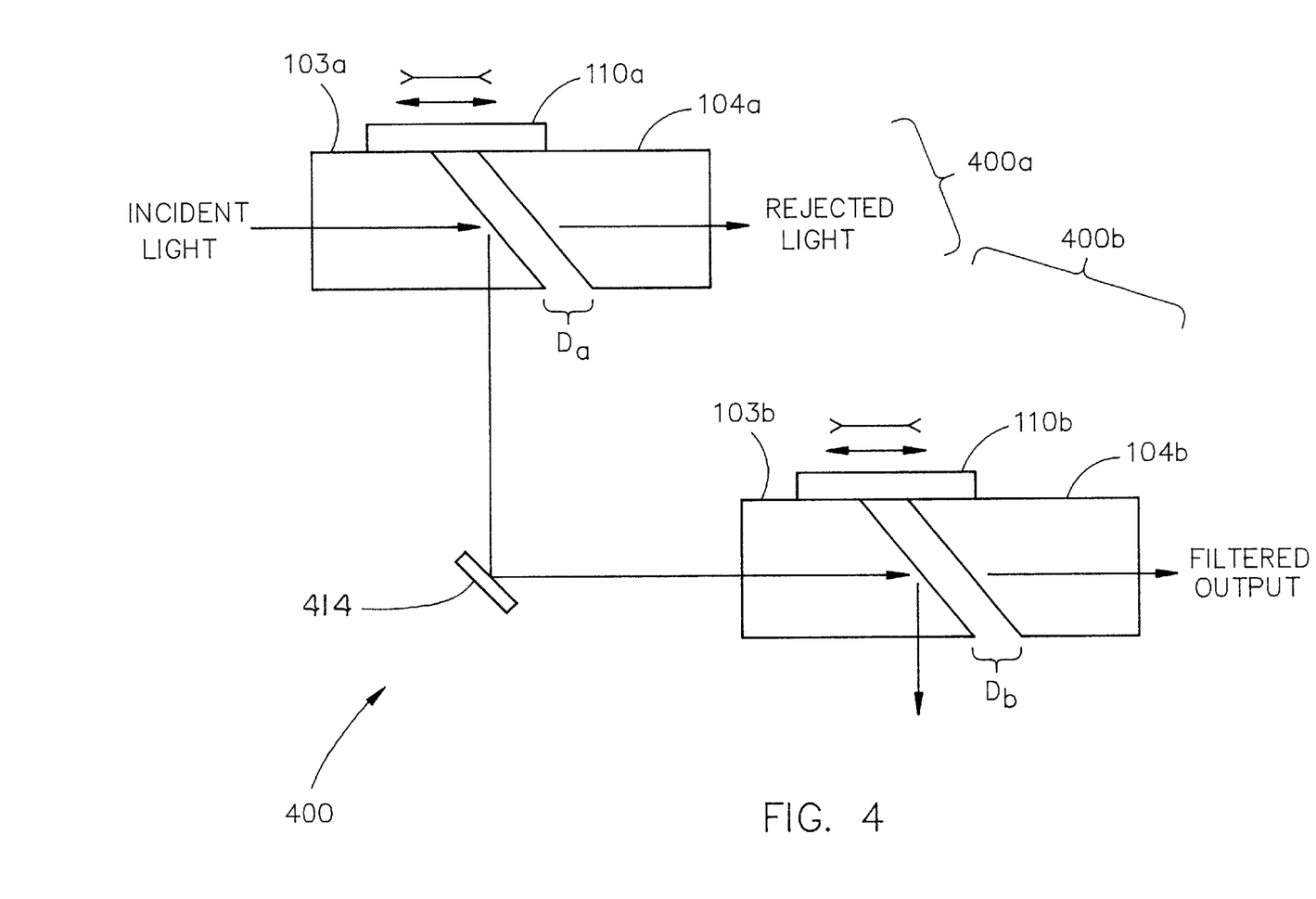
FIG. 4 is a schematic diagram of an alternative band pass filter arrangement.

FIG. 4 is a schematic diagram of an alternative band pass filter 400. In this alternative embodiment, the first filter 400a and the second filter 400b are the same as those shown in FIG. 2 except that in this embodiment the rejected light from the first filter 400a is directed into the second filter 400b through use of a reflector 414, such as a mirror, for example.

Figure 5:
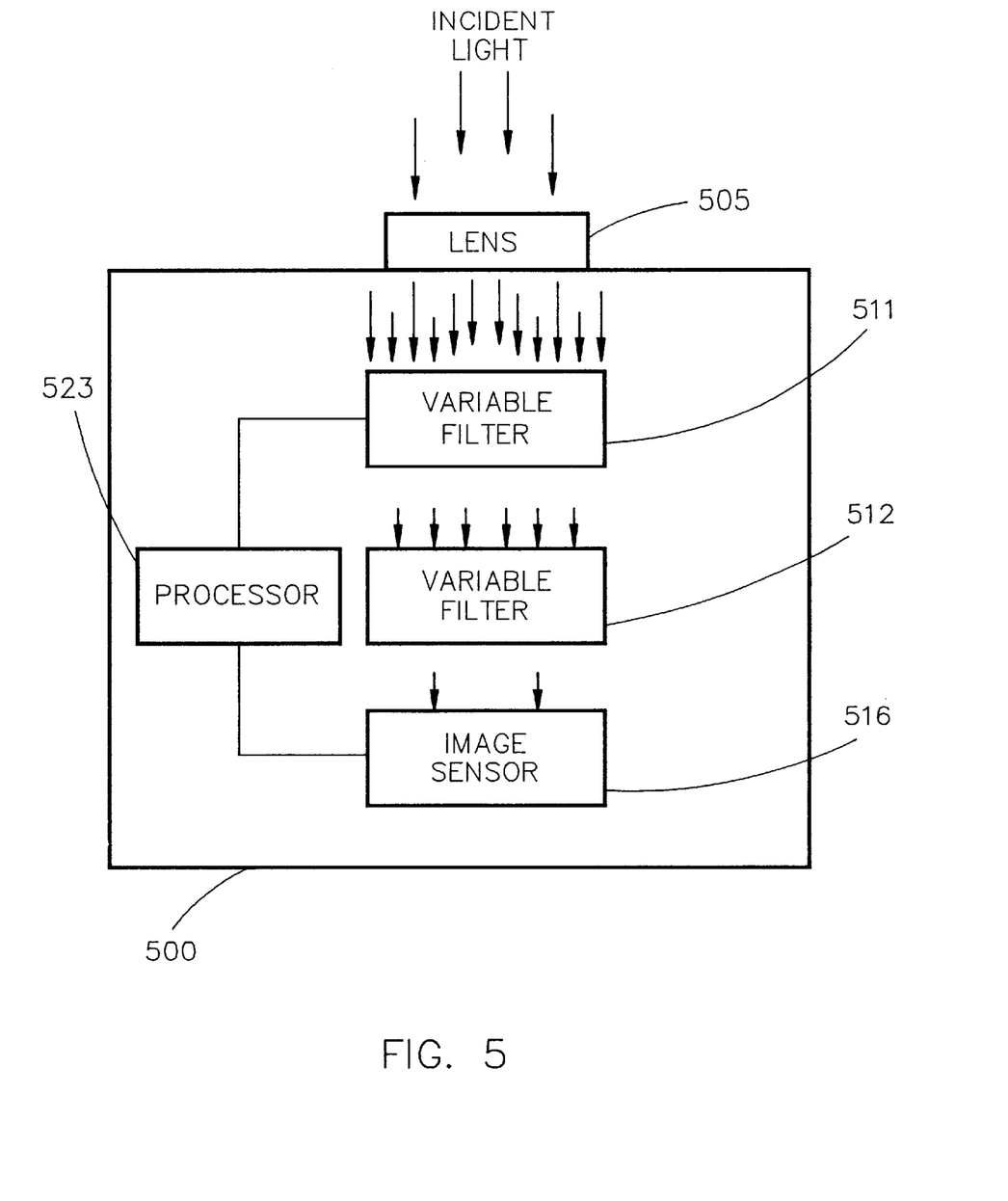
FIG. 5 is a schematic diagram of an image capturing device according to another embodiment of the invention.

FIG. 5 is a schematic diagram of an image capturing device 500 according to another embodiment of the invention. The image capturing device 500 includes a lens 505, an electronically variable optical filter 511 according to the invention, a processor 523, and an image sensor 516.

The processor 523 may be any type of general purpose processor. The processor 523 executes a control routine for the image capturing device 500. In addition, the processor 523 may control the electronically variable optical filter 511 in order to regulate incident light.

The electronically variable optical filter 511 may be formed as a two-dimensional filter that selectively admits light to the image sensor 516. The image sensor 516 may be a CCD array, a CMOS sensor, or even a conventional photographic film. Alternatively, the filter 511 may be adjusted in some manner by the user.

In one embodiment, the image capturing device 500 may optionally include one or more additional electrically variable optical filters 512. The multiple electrically variable optical filters may form a variable cutoff frequency filter, a variable band pass filter, etc. In addition, the multiple electronically variable optical filters may be used as a color filter.

Alternatively, multiple electronically variable optical filters may be used to capture substantially monochromatic images, such as images illuminated by laser light. Moreover, the invention may be used for distance measurement and may be used to optimize reception of a laser beam, i.e., may be used to construct a filter that rejects non-laser light wavelengths (in order to improve distance measurement with a laser, for example). This monochromatic light filtering ability may even be used to allow the image capturing device 500 to train a laser on a target, measure the distance to the target, and yet not record the reflected laser light as a bright spot in a captured digital image. In addition, the multiple electronically variable optical filters may even be used to shutter light to the image sensor 516.

Figure 6:
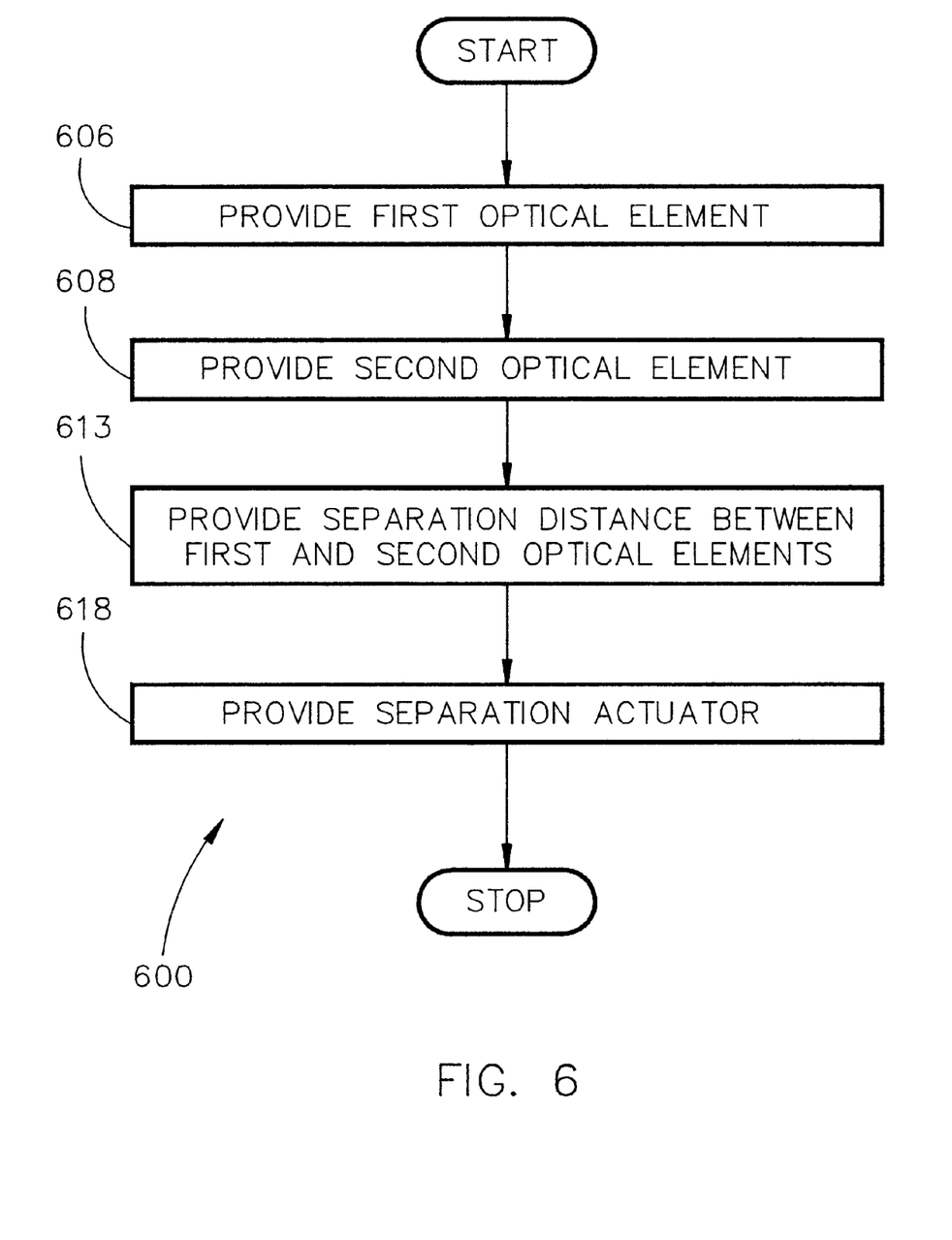
FIG. 6 is a flowchart of a method of forming an electronically variable optical filter according to yet another embodiment of the invention.

FIG. 6 is a flowchart 600 of a method of forming an electronically variable optical filter according to yet another embodiment of the invention. In step 606, a first optical element is provided.

In step 608, a second optical element is provided. The optical elements may be prisms formed of any suitable light-transmissive material. The optical elements may include angled faces that are capable of reflecting or transmitting light.

In step 613, a separation distance D is provided between the first optical element and the second optical element. The separation distance D may be equal to any visible light wavelength, or beyond. If the separation distance D is varied to a value outside a wavelength of the visible light spectrum, the electrically variable optical filter may become substantially opaque to visible light.

In step 618, a separation actuator is provided. The separation actuator moves the two optical elements together or apart. The separation actuator therefore controls the separation distance D between the two optical elements. Consequently, the electrically variable optical filter may be electronically controlled to control a cutoff frequency point by controlling the separation distance D.

The electronically variable optical filter according to the invention may be used in numerous devices that employ light and/or operate on light. For example, the filter may be used in imaging devices, measurement instruments, optical communications devices, optical computing devices, etc. Moreover, the filter may be used in any application that selectively admits light, such as a camera. In addition, the filter may be used for color filtering, regular photography, infrared photography, or other infrared imaging, such as spectroscopy, etc. In addition, the filter may be used to capture an image using substantially coherent light.

The invention differs from the prior art in that the invention provides an electronically variable optical filter. The invention provides a variable optical filter wherein the optical cutoff frequency may be electronically varied over a relatively broad range. The electronically variable optical filter has a fast response time, a sharp cutoff characteristic, and a wide tunability range. In addition, the electronically variable optical filter of the invention is physically small and light and is simple in construction. The filter does not require any moving fluids, gases or other moving parts. The filter therefore may be easily manufactured.

The electronically variable optical filter according to the invention provides several benefits. It provides an improved filtering capability, allows precise control over wavelengths of incident light, and provides a precisely controllable optical filter. In addition, it provides these benefits with a simple filter design and with an optical filter that is easy to chain or group together to perform many levels or types of filtering. Multiple filters may be linked in order to pass specific bands of light. Moreover, the electronically variable optical filter according to the invention is easy to manufacture.

We claim:

1. An electrically variable optical filter, comprising:
   a first optical element including a first angled face with respect to incident light;
   a second optical element including a second angled face, with said second angled face being substantially parallel to and spaced apart from said first angled face;
   at least one separation actuator, said at least one separation actuator being affixed between said first optical element and said second optical element and operable to change a separation distance D between said first angled face and said second angled face, whereby said incident light transmitted through said first optical element is selectively transmitted through to or reflected away from said second optical element as a function of wavelength and said separation distance D;
   said incident light being transmitted through said first optical element to said second optical element if said separation distance D is less than a wavelength of said incident light and being reflected away from said second optical element if said separation distance D is greater than or equal to said wavelength of said incident light.

2. The filter of claim 1, wherein a cutoff frequency of said electrically variable optical filter is controlled by said separation distance.

3. The filter of claim 1, wherein a cutoff frequency of said electrically variable optical filter is electrically controlled by controlling said separation distance.

4. The filter of claim 1, wherein said at least one separation actuator comprises a piezoelectric element.

5. The filter of claim 1, wherein two or more electrically variable optical filters are combined to form a band-pass optical filter, comprising:
   a first electrically variable optical filter including a first cutoff frequency, wherein said first electrically variable optical filter substantially passes light frequencies above said first cutoff frequency and reflects light below said first cutoff frequency into a second beam; and
   a second electrically variable optical filter including a second cutoff frequency is positioned in said second beam and substantially passes light frequencies above said second cutoff frequency;
   wherein said first cutoff frequency is lower than said second cutoff frequency and wherein said first electrically variable optical filter and said second electrically variable optical filter combine to form an electrically variable optical band pass filter.

6. The filter of claim 1, wherein said electrically variable optical filter comprises an optical switch.

7. The filter of claim 1, wherein said electrically variable optical filter comprises a frequency-based optical beam splitter.

8. The filter of claim 1, wherein said electrically variable optical filter comprises a camera shutter.

9. The filter of claim 1, wherein said first angled face and said second angled face are formed at an angle of about 45 degrees to an adjacent exterior surface.

10. An electrically variable optical filter, comprising:

a first optical element including a first angled face with respect to incident light;

a second optical element including a second angled face, with said second angled face being substantially parallel to and spaced apart from said first angled face;

at least one separation means operable to change a separation distance D between said first angled face and said second angled face, whereby said incident light transmitted through said first optical element is selectively transmitted through to or reflected away from said second optical element as a function of wavelength and said separation distance D;

said incident light being transmitted through said first optical element to said second optical element if said separation distance D is less than a wavelength of said incident light and being reflected away from said second optical element if said separation distance D is greater than or equal to said wavelength of said incident light.

11. The filter of claim 10, wherein a cutoff frequency of said electrically variable optical filter is controlled by said separation distance.

12. The filter of claim 10, wherein a cutoff frequency of said electrically variable optical filter is electrically controlled by controlling said separation distance.

13. The filter of claim 10, wherein said at least one separation actuator comprises a piezoelectric element.

14. The filter of claim 10, wherein two or more electrically variable optical filters are combined to form a bandpass optical filter, comprising:

a first electrically variable optical filter including a first cutoff frequency, wherein said first electrically variable optical filter substantially passes light frequencies above said first cutoff frequency and reflects light below said first cutoff frequency into a second beam; and a second electrically variable optical filter including a second cutoff frequency is positioned in said second beam and substantially passes light frequencies above said second cutoff frequency;

wherein said first cutoff frequency is lower than said second cutoff frequency and wherein said first electrically variable optical filter and said second electrically variable optical filter combine to form an electrically variable optical band pass filter.

15. The filter of claim 10, wherein said electrically variable optical filter comprises an optical switch.

16. The filter of claim 10, wherein said electrically variable optical filter comprises a frequency-based optical beam splitter.

17. The filter of claim 10, wherein said electrically variable optical filter comprises a camera shutter.

18. The filter of claim 10, wherein said first angled face and said second angled face are formed at an angle of about 45 degrees to an adjacent exterior surface.

19. A method of forming an electrically variable optical filter, comprising the steps of:

providing a first optical element including a first angled face with respect to incident light;

providing a second optical element including a second angled face, with said second angled face being substantially parallel to and spaced apart from said first angled face by a separation distance D;

providing at least one separation actuator that controls said separation distance D to thereby selectively control the wavelength of light passing from said first optical element into said second optical element; and whereby said incident light is transmitted through said first optical element to said second optical element if said separation distance D is less than a wavelength of said incident light and is reflected away from said second optical element if said separation distance D is greater than or equal to said wavelength of said incident light.

20. The method of claim 19, wherein said at least one separation actuator electrically varies said separation distance in order to selectively reflect or transmit light.

21. The method of claim 19, wherein the step of providing said at least one separation actuator comprises providing a piezoelectric element.

22. The method of claim 19, wherein said separation distance is varied from about 400 nanometers to about 700 nanometers.

23. The method of claim 19, further comprising the step of combining two or more electrically variable optical filters to form an electrically variable optical bandpass filter.

24. The method of claim 19, wherein said first angled face and said second angled face are formed at an angle of about 45 degrees to an adjacent exterior surface.

* * * * *